US008659630B2

(12) United States Patent
Komai et al.

(10) Patent No.: US 8,659,630 B2
(45) Date of Patent: Feb. 25, 2014

(54) IMAGE PROCESSING APPARATUS, IMAGE PROCESSING METHOD, AND COMPUTER PROGRAM PRODUCT FOR IMAGE PROCESSING (75) Inventors: Kunihiro Komai, Osaka (JP); Izumi Kinoshita, Hyogo (JP); Tatsuya Miyadera, Osaka (JP); Yoshinori Shirasaki, Osaka (JP); Takuhei Yokoyama, Osaka (JP); Takeshi Shikama, Osaka (JP); Akinori Yamaguchi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 145 days.

(21) Appl. No.: 13/230,065

(22) Filed: Sep. 12, 2011

(65) Prior Publication Data
US 2012/0062682 A1 Mar. 15, 2012

(30) Foreign Application Priority Data

Sep. 15, 2010 (JP) ................................. 2010-206784

(51) Int. Cl.
*B41J 2/415* (2006.01)
*G03G 13/04* (2006.01)

(52) U.S. Cl.
USPC ........... 347/131; 347/130; 347/132; 347/133; 347/135

(58) Field of Classification Search
USPC ......................................... 347/131–134, 135
See application file for complete search history.

(56) References Cited

U.S. PATENT DOCUMENTS

| 5,241,324 | A | * | 8/1993 | Tamura et al. ................. 347/240 |
| 5,478,156 | A | * | 12/1995 | Kikuchi et al. .......... 400/120.01 |
| 5,583,558 | A | * | 12/1996 | Yajima .......................... 347/240 |
| 5,621,453 | A | * | 4/1997 | Fujita et al. ................... 347/240 |
| 5,809,216 | A | * | 9/1998 | Ng ................................. 358/1.9 |
| 5,926,616 | A | * | 7/1999 | Sato et al. ...................... 358/1.2 |
| 6,124,875 | A | * | 9/2000 | Inukai ........................... 347/237 |
| 7,494,202 | B2 | * | 2/2009 | Sato ................................ 347/11 |
| 7,602,411 | B2 | * | 10/2009 | Wakasugi ..................... 347/251 |
| 7,770,987 | B2 | * | 8/2010 | Nakasendo ...................... 347/5 |
| 7,924,467 | B2 | * | 4/2011 | Waksugi ....................... 358/3.2 |
| 8,294,963 | B2 | * | 10/2012 | Yaji ............................... 358/521 |
| 8,314,968 | B2 | * | 11/2012 | Mori .............................. 358/1.9 |
| 2006/0203310 | A1 | * | 9/2006 | Yamaguchi et al. .......... 358/509 |
| 2009/0034034 | A1 | * | 2/2009 | Ido ................................ 358/525 |

FOREIGN PATENT DOCUMENTS

| JP | 7-314791 | 12/1995 |
| JP | 2005-22410 | 1/2005 |
| JP | 2007-245537 | 9/2007 |
| JP | 4371322 | 9/2009 |

* cited by examiner

*Primary Examiner* — Laura Martin
*Assistant Examiner* — Jeremy Bishop
(74) *Attorney, Agent, or Firm* — Oblon, Spivak, McClelland, Maier & Neustadt, L.L.P.

(57) ABSTRACT

An embodiment of the image processing apparatus for controlling the lighting of a line head that is driven with binary data and performs exposure with subline lighting to thereby form images, includes: a subline generating unit that generates a plurality of sublines from a same image data; an inclination correcting unit that exposes the generated sublines so as to generate correction image data used to correct an inclination of an exposure position; a gradation control unit that controls the lighting of sublines based on the correction image data generated by the inclination correcting unit to express gradation; and a light intensity correction unit that corrects and controls the light intensity based on the correction image data generated by the inclination correcting unit, wherein an output of the gradation control unit and an output of the light intensity correction unit are input into the line head in parallel.

11 Claims, 9 Drawing Sheets

INPUT IMAGE DATA (300dpi × 3bit)

FIG.10B

LIGHTING IMAGE WITH 600 dpi
HEAD IN 2X DENSITY (MAIN) AND
4X DENSITY (SUB)

IMAGE PROCESSING APPARATUS, IMAGE PROCESSING METHOD, AND COMPUTER PROGRAM PRODUCT FOR IMAGE PROCESSING

CROSS-REFERENCE TO RELATED APPLICATIONS

The present application claims priority to and incorporates by reference the entire contents of Japanese Patent Application No. 2010-206784 filed in Japan on Sep. 15, 2010.

BACKGROUND OF THE INVENTION

1. Field of the Invention

The present invention relates to an image processing apparatus, image forming method, and computer program for image forming, especially for performing optical writing with a line head that performs exposure by lighting sublines to thereby form images.

2. Description of the Related Art

A light emitting diode array head (hereinafter referred to as a LEDA head) used in electrophotography image forming apparatuses needs to correct inclination due to its attachment to an image writing apparatus body and a swelling (bowing) of the LEDA head itself. This is referred to as skew correction. In particular, as a technique relating to gradation control when a binary LEDA head is used, known is a technique of lighting one line several times (sublimes emitting) in a sub-scanning direction to thereby light respective sublines at different time to thereby realize a higher gradation level than that obtained by lighting the respective sublines at the same time.

An example of such a technique is disclosed in Japanese Patent No. 4371322, for example. Specifically, Japanese Patent No. 4371322 discloses an image forming apparatus that drives a light source several times to thereby form images. The image forming apparatus includes: a strobe signal for lighting a plurality of light sources arranged in an extension direction of lines at positions of M lines to thereby form gradation images at a plurality of lines; a lookup table that stores values representing the lighting driving patterns of the M lines to be output with respect to one value of input image data which is N-bit gradation data P (M<N); and an exposure pattern switching control unit that reads a value representing the driving pattern corresponding to the input image data from the lookup table to thereby control the light sources. The lookup table stores a set of 2(N−M) values representing the lighting driving patterns of the M lines output with respect to one value of the input image data in a specific order and stores different exposure pattern data values to be allocated to the respective values of the set of 2(N−M) values. The exposure pattern switching control unit includes: a pattern selection signal for performing switching so that the different exposure pattern data values are allocated to adjacent light sources; and a selector that selects a value corresponding to the exposure pattern data value from the set of plural lighting driving pattern values. The value corresponding to the output gradation data of the input image data is a value obtained by dividing the sum of the set of 2(N−M) values corresponding to the input image data divided by the number of values in the set.

However, when writing is performed by lighting sublines, in the gradation control of the related art, it is not possible to realize a higher gradation if skew correction is performed.

Specifically, for example, there is a case in which one line is exposed through four times of subline lighting. Specifically, the first subline is lit for 8 μs, the second for 4 μs, the third for 2 μs, and the fourth for 1 μs; and skew is corrected in each adjacent area by an amount corresponding to one subline (see FIG. 4 described later). In this case, in a skew correction area A (see pixel 0 in FIG. 4), as an example, when forming one pixel, a gradation corresponding to 12 μs can be expressed through lighting of the first and second sublines. However, in a skew correction area B (an area shifted by one subline from the area A: see pixel 1 in FIG. 4), when forming one pixel, since the first subline is lit for 4 μs, the second for 2 μs, the third for 1 μs, and the fourth for 8 μs, it is necessary to light the first and fourth sublines in order to express a gradation level corresponding to 12 μs as like the area A. Thus, the amounts of attached toner are different from the area B (pixel 1 in FIG. 4) to the area A (pixel 0 in FIG. 4), and it is not possible to obtain a desired gradation.

SUMMARY OF THE INVENTION

It is an object of the present invention to at least partially solve the problems in the conventional technology.

According to an aspect of the present invention, there is provided an image processing apparatus for controlling the lighting of a line head that is driven with binary data and performs exposure with subline lighting to thereby form images, including: a subline generating unit that generates a plurality of sublines from a same image data; an inclination correcting unit that exposes the generated sublines so as to generate correction image data used to correct an inclination of an exposure position; a gradation control unit that controls the lighting of sublines based on the correction image data generated by the inclination correcting unit to express gradation; and a light intensity correction unit that corrects and controls the light intensity based on the correction image data generated by the inclination correcting unit, wherein an output of the gradation control unit and an output of the light intensity correction unit are input into the line head in parallel.

According to another aspect of the present invention, there is provided an image processing method for controlling lighting of a line head that performs exposure through subline lighting to thereby form images, including: generating a plurality of sublines from a same image data; exposing the generated sublines so as to generate correction image data for correcting an inclination of an exposure position; controlling the lighting of sublines based on the correction image data generated at the exposing so as to express gradation; and correcting the light intensity based on the correction image data generated at the exposing so as to control the light intensity.

According to another aspect of the present invention, there is provided a computer program product including a non-transitory computer-usable medium having computer-readable program codes embodied in the medium for image processing in controlling lighting of a line head that performs exposure through subline lighting to thereby form images, the program codes when executed causing a computer to execute: generating a plurality of sublines from a same image data; exposing the generated sublines so as to generate correction image data for correcting an inclination of an exposure position; controlling the lighting of sublines based on the correction image data generated at the exposing so as to express gradation; and correcting the light intensity based on the correction image data generated at the exposing so as to control the light intensity.

The above and other objects, features, advantages and technical and industrial significance of this invention will be better understood by reading the following detailed descrip-

DETAILED DESCRIPTION OF THE PREFERRED EMBODIMENTS

The present invention provides an image forming apparatus that includes an optical writing device which uses a LEDA head driven with binary data as an exposure source, in which a gradation expression when skew correction is performed is controlled by a combination of exposure time control through subline lighting and light intensity correction control that controls current supplied to LED elements.

In the embodiment described later, the line head corresponds to a LEDA head 114, image data corresponds to VIDEO data 115, the subline generation means corresponds to a subline generating unit 104 and first to fourth line memories 105 to 108, the inclination correction means corresponds to a correction image data output unit 113, the gradation control means corresponds to a gradation control circuit 116, and the light intensity correction means corresponds to a light intensity correction circuit 117.

Hereinafter, an embodiment will be described with reference to the drawings.

Figure 1:
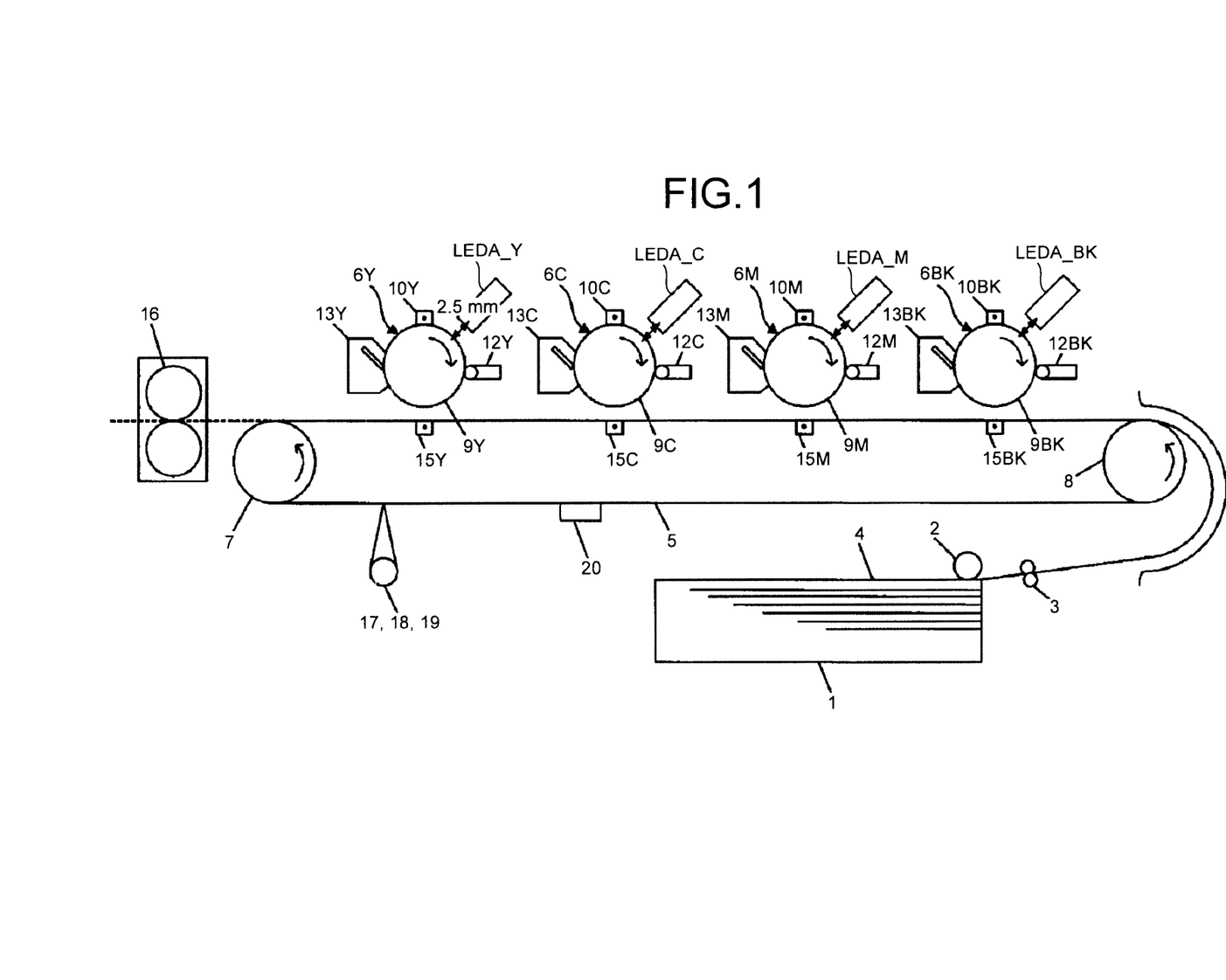
FIG. 1 is a diagram illustrating a simplified configuration of a direct transfer tandem-type image forming apparatus including a LEDA head according to an embodiment.
Figure 2:
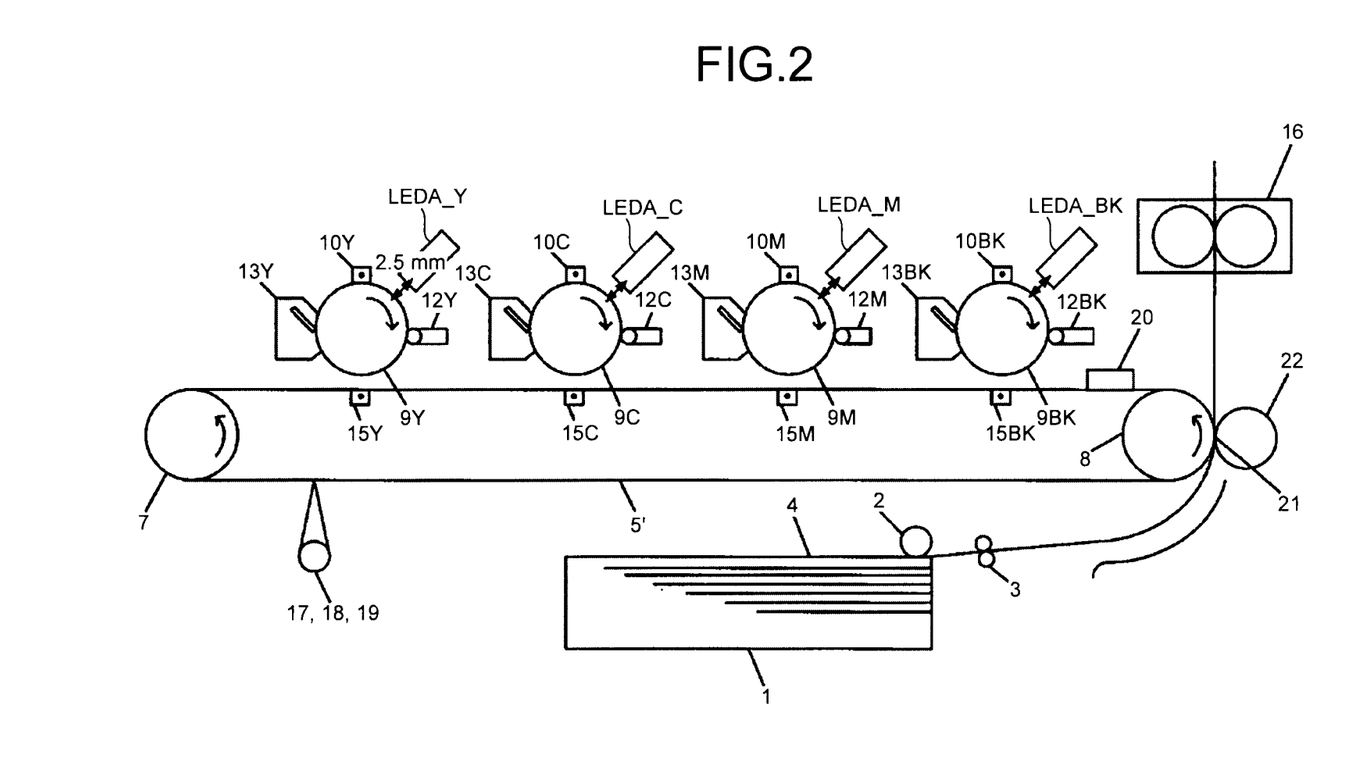
FIG. 2 is a diagram illustrating a simplified configuration of an indirect transfer tandem-type image forming apparatus including a LEDA head according to an embodiment.

FIGS. 1 and 2 are diagrams illustrating an overall configuration of an image forming unit (printer unit) of an electrophotography image forming apparatus including a LEDA head. FIG. 1 shows a direct transfer tandem-type image forming apparatus in which a sheet-shaped recording medium (hereinafter simply referred to as a "sheet") such as a sheet, a transfer paper, a recording paper, a film-shaped member is adsorbed and conveyed on a conveying belt; and toners of the respective colors KMCY are superimposed on the sheet to thereby form a full-color image. FIG. 2 shows an indirect transfer tandem-type image forming apparatus in which toners of the respective colors KMCY are superimposed on an intermediate transfer belt to thereby form a full-color image; and the formed full-color image is transferred to a sheet at once to thereby form a full-color image.

In FIG. 1, the direct transfer tandem-type image forming apparatus according to the present embodiment has a configuration in which image forming units of the respective colors are arranged along a conveying belt which is an endless moving means. That is, a plurality of image forming units (electrophotography process units) 6BK, 6M, 6C, and 6Y is arranged along a conveying belt 5 that conveys sheets 4 fed from a paper feed tray 1 and separated by a paper feeding roller 2 and a separation roller 3 in that order from the upstream side in the conveying direction of the conveying belt 5. These image forming units 6BK, 6M, 6C, and 6Y have the same inner configuration except that they form toner images of different colors. The image forming unit 6BK forms a black image, the image forming unit 6M forms a magenta image, the image forming unit 6C forms a cyan image, and the image forming unit 6Y forms a yellow image. Therefore, in the following description, the image forming unit 6BK will be described in detail. Since the other image forming units 6M, 6C, and 6Y are the same as the image forming unit 6BK, the respective constituent elements of the image forming units 6M, 6C, and 6Y will be denoted by reference numerals, respectively ending with M, C, and Y instead of BK assigned to the respective constituent elements of the image forming unit 6BK, and redundant description thereof will not be provided.

The conveying belt 5 is an endless belt wound around a driving roller 7 and a driven roller 8 which are rotated. The driving roller 7 is rotated by a driving motor (not shown), and the driving motor, the driving roller 7, and the driven roller 8 function as a driving means for moving the conveying belt 5 which is an endless moving means. During image formation, the sheets 4 stored in the paper feed tray 1 are fed in order starting from the uppermost one. The fed sheet 4 is adsorbed onto the conveying belt 5 by an electrostatic adsorption effect and conveyed to the first image forming unit 6BK by the rotating conveying belt 5, where a black toner image is transferred to the sheet 4. The image forming unit 6BK includes a photosensitive drum 9BK serving as a photosensitive element, and a charging unit 10BK, a LEDA head LEDA_BK, a developing unit 12BK, a photosensitive element cleaner 13BK, and a neutralization unit (not shown) disposed around the photosensitive drum 9BK. The LEDA head LEDA_BK is configured to expose the respective image forming units 6BK, 6M, 6C, and 6Y and the respective photosensitive drums 9BK, 9M, 9C, and 9Y.

During image formation, after being uniformly charged by the charging unit 10BK in the dark, the outer surface of the photosensitive drum 9BK is exposed to illumination light corresponding to a black image from the LEDA head LEDA_BK, whereby an electrostatic latent image is formed thereon. The developing unit 12BK visualizes this electrostatic latent image with a black toner, so that a black toner image is formed on the photosensitive drum 9BK.

The toner image is transferred to the sheet 4 by the function of a transfer unit 15BK at a position (transfer position) where the photosensitive drum 9BK comes into contact with the sheet 4 on the conveying belt 5. As a result of the transferring, a black BK toner image is formed on the sheet 4. After the transferring of the toner image is finished, unnecessary toner remaining on the outer surface of the photosensitive drum 9BK is removed by the photosensitive element cleaner 13BK.

Thereafter, the photosensitive drum 9BK is neutralized by the neutralization unit, and performs standby for the next image forming operation.

The sheet 4, to which the black BK toner image has been transferred by the image forming unit 6BK in the above-described manner, is conveyed to the next image forming unit 6M by the conveying belt 5. In the image forming unit 6M, a magenta M toner image is formed on a photosensitive drum 9M by the same image forming process as the image forming process in the image forming unit 6BK; and the toner image is transferred so as to be superimposed on the black BK toner image formed on the sheet 4. The sheet 4 is further conveyed to the next image forming units 6C and 6Y, so that a cyan C toner image formed on a photosensitive drum 9C and a yellow Y toner image formed on a photosensitive drum 9Y are transferred to the sheet 4 in a superimposed manner by the same operations. As a result, a full-color image is formed on the sheet 4. The sheet 4 having the full-color superimposed image formed thereon is separated from the conveying belt 5, and the image is fixed to the sheet in a fixing unit 16. Thereafter, the sheet 4 is discharged to the outside of the image forming apparatus.

In the figure, reference numerals 17, 18, and 19 represent light-reflecting toner mark sensors for correcting a position shift, and reference numeral 20 represents a cleaning device of the conveying belt 5.

In FIG. 2, the indirect transfer tandem-type image forming apparatus according to the present embodiment has a configuration in which an intermediate transfer belt 5' is used as a endless moving means in place of the conveying belt 5 shown in FIG. 1, and four color images superimposed on the intermediate transfer belt 5' are transferred to a sheet at once. The intermediate transfer belt 5' is an endless belt that is wound around a driving roller 7 and a driven roller 8 which are rotated. The respective color toner images are transferred to the intermediate transfer belt 5' at a position (primary transfer position) where the photosensitive drums 9BK, 9M, 9C, and 9Y come into contact with the intermediate transfer belt 5' by the function of transfer units 15BK, 15M, 15C, and 15Y. As a result of the transferring, a full-color image in which toner images of the respective colors are superimposed on each other is formed on the intermediate transfer belt 5'. During image formation, the sheets 4 stored in the paper feed tray 1 are fed in an order starting from the uppermost one. The fed sheet 4 is conveyed onto the intermediate transfer belt 5', and the full-color toner image is transferred at a position (secondary transfer position 21) where the intermediate transfer belt 5' comes into contact with the sheet 4. At the secondary transfer position, a secondary transfer roller 22 is disposed so as to press the sheet 4 against the intermediate transfer belt 5' to thereby enhancing transfer efficiency. The secondary transfer roller 22 is closely contacted with the intermediate transfer belt 5', and a cam mechanism is not provided.

The direct transfer tandem-type image forming apparatus shown in FIG. 1 has the same configuration as the indirect transfer tandem-type image forming apparatus shown in FIG. 2 except for the following respects. In the former image forming apparatus, the primary transfer medium is the sheet 4, and a full-color image is formed by the primary transfer operation. In contrast, in the latter image forming apparatus, the primary transfer medium is the intermediate transfer belt 5'; and after a full-color image is formed on the intermediate transfer belt 5', the image on the intermediate transfer belt 5' is secondarily transferred to the sheet, whereby the image is formed on the sheet. The other constituent elements are the same. In the figure, reference numeral 20 represents a cleaning device that cleans toner which remains on the intermediate transfer belt 5' without being secondarily transferred to the sheet 4.

Figure 3:
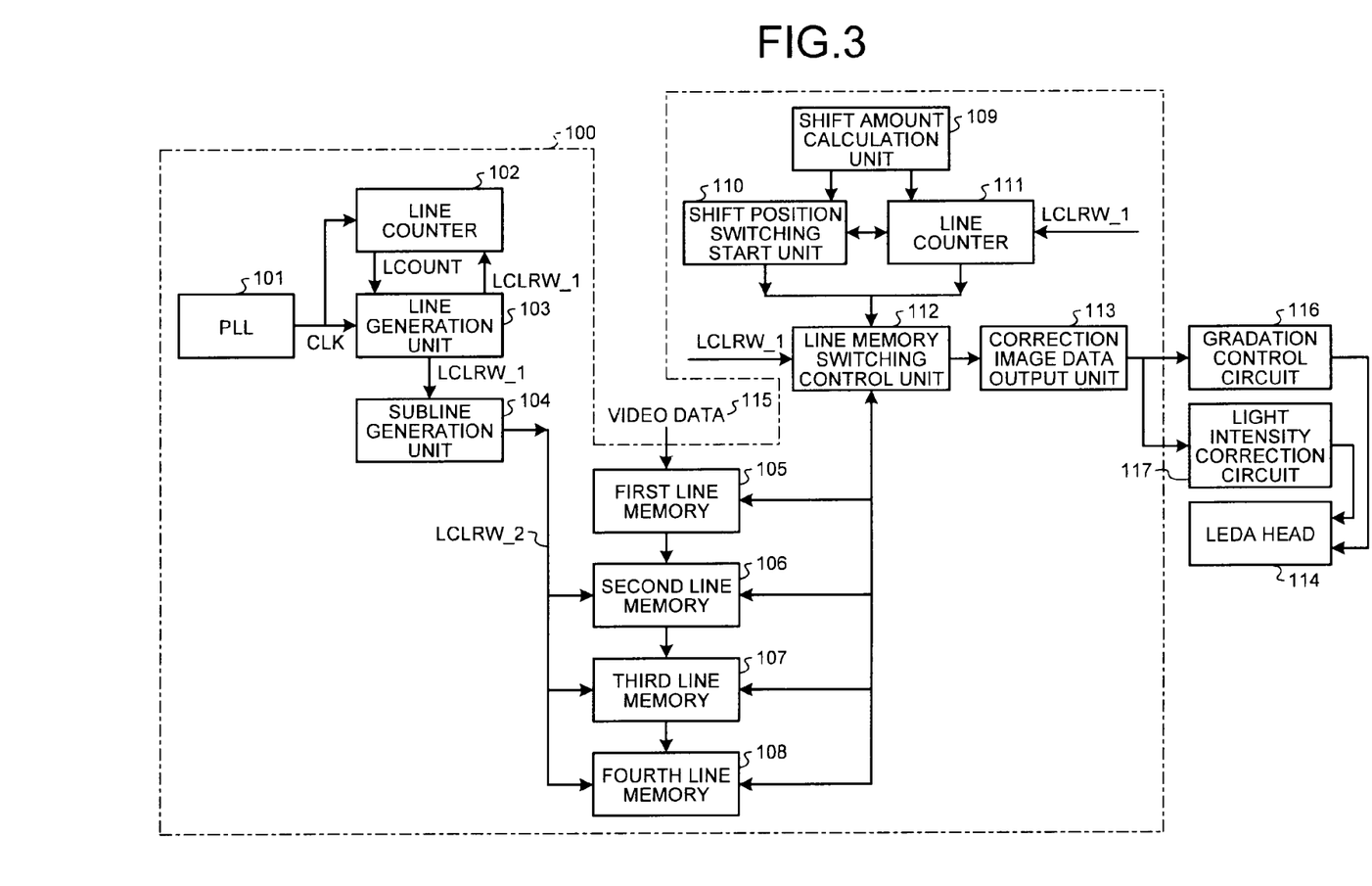
FIG. 3 is a block diagram illustrating a circuit configuration of a skew correction circuit of an image forming apparatus including a LEDA head.

FIG. 3 is a block diagram illustrating a circuit configuration of a skew correction circuit of an image forming apparatus including a LEDA head. The skew correction circuit is configured to output images which have been subjected to skew correction from a LEDA head using a line memory.

As shown in FIG. 3, a skew correction circuit 100 includes a high-frequency clock oscillator (phase-locked loop: PLL) 101, a line counter 102, a line generation unit 103, a subline generating unit 104, first to fourth line memories 105, 106, 107, and 108, a shift amount calculation unit 109, a shift position switching start unit 110, a line counter 111, a line memory switching control unit 112, and a correction image data output unit 113.

Moreover, the output of the correction image data output unit 113 is input to a gradation control circuit 116 and a light intensity correction circuit 117 in parallel. The outputs of the gradation control circuit 116 and the light intensity correction circuit 117 are input to a driving circuit mounted on a control substrate of a LEDA head 114, whereby the LEDA head 114 is lit.

The high-frequency clock oscillator 101 generates a high-frequency clock which is a reference clock of the skew correction circuit 100; and the skew correction circuit 100 is operated based on the high-frequency clock generated by the high-frequency clock oscillator 101. The line counter 102 counts the high-frequency clocks input from the high-frequency clock oscillator 101 and is reset to "0" in response to a line clear signal supplied from the line generation unit 103.

The line generation unit 103 receives the high-frequency clock from the high-frequency clock oscillator 101 and a count signal (LCOUNT) from the line counter 102, and generates a line clear signal (LCLRW_1) when the count value from the line counter 102 reaches a predetermined value. The count value of the line counter 102 is reset to "0" when the line clear signal (LCLRW_1) is generated.

The subline generating unit 104 generates a pulse signal (LCLRW_2) whenever the line clear signal is generated four times; and the generated pulse signal (LCLRW_2) is input to the second to fourth line memories 106, 107, and 108.

In the skew correction circuit 100, VIDEO data (bitmap data) 115 is input from a controller of a personal computer (PC) or an image forming apparatus body to a line memory (in this example, the first line memory 105). The line cycle of the VIDEO data (image data) is the same as the generation cycle of the pulse signal (LCLRW_2) generated by the subline generating unit 104. Moreover, the VIDEO data 115 is data which has been subjected to a dithering process by the controller of the image forming apparatus body according to the present embodiment.

The line memory stores one line of VIDEO data whenever the subline generating unit 104 generates the pulse signal (LCLRW_2). When there are four line memories of the first to fourth line memories 105, 106, 107, and 108 like the present embodiment, four lines of data are sequentially stored. That is, whenever the pulse signal (LCLRW_2) is generated, the data in the first line memory 105 is shifted to the second line memory 106, and the data in the second line memory 106 is shifted to the third line memory 107. As a result, four lines of data are stored in these four line memories 105, 106, 107, and 108. The fifth or later line of VIDEO data is overwritten and deleted in an order starting from the oldest one.

The shift amount calculation unit 109 calculates the number of steps to shift the first to fourth line memories 105, 106, 107, and 108 and the main-scanning position in accordance with a skew correction amount. Here, when performing skew correction, first, the shift amount calculation unit 109 sets a line delay amount for performing skew correction and a shift position in the main-scanning direction based on the calculation result. The skew correction amount is determined based on a skew amount obtained by forming predetermined toner patterns with respective color toners on the conveying belt 5 or the intermediate transfer belt 5' to detect the toner patterns using an optical sensor to thereby calculate a shift amount between respective colors with respect to each factor such as misregistration in the main and sub-scanning directions, magnification errors, or skew. In this case, the skew of laser light that perform scanning exposure is also included as the factor of the color shift of an image and calculated.

The line counter 111 is a counter that indicates a line memory to be accessed and is reset whenever the line generation unit 103 generates the line clear signal LCLRW_1. The line counter 111 calculates the time to access and the access target line memory in order to generate data after skew correction based the line delay amount signal and the shift position signal in the main-scanning direction, supplied from the shift amount calculation unit 109.

The shift position switching start unit 110 generates a pulse signal in accordance with an instruction from the line counter 111 at the time when the first to fourth line memories 105, 106, 107, and 108 are switched during scanning in the main-scanning direction. That is, the shift position switching start unit 110 generates a signal SK_START when the main-scanning position at which the first to fourth line memories 105, 106, 107, and 108 are switched is reached.

The line memory switching control unit 112 switches the reading target line memories 105, 106, 107, and 108 in response to the switching instruction signal SK_START from the shift position switching start unit 110 and outputs the image data stored in the reading target line memory to the correction image data output unit 113.

The correction image data (SK_DATA) output from the correction image data output unit 113 becomes exposure data after skew correction output from the line memory switching control unit 112. The exposure data (correction image data) (SK_DATA) is output to the LEDA head 114 and output to the gradation control circuit 116 and the light intensity correction circuit 117, respectively.

The driving circuit of the LEDA head 114 lights the LEDs of the LEDA head 114 based on the gradation control signal input from the gradation control circuit 116 and the light intensity correction signal from the light intensity correction circuit 117. In this way, the photosensitive drums 9BK, 9M, 9C, and 9Y are exposed by the LEDA heads LEDA_BK, LEDA_M, LEDA_C, and LEDA_Y shown in FIGS. 1 and 2.

The line memory switching control unit 112 includes a central processing unit (CPU) or an application specific integrated circuit (ASIC). When a CPU is used, the CPU reads program codes stored in a ROM (not shown), expands them into a RAM (not shown), and execute control defined by the program codes while using the RAM as a work area and a data buffer. When an ASIC is used, control procedures are configured in advance by a logic circuit, and predetermined control is executed by the processing of the logic circuit.

As above, the VIDEO data 115 is VIDEO data which has been subjected to a dithering process by the controller of the image forming apparatus body. The skew correction circuit 100 performs skew correction on the VIDEO data, and the correction image data SK_DATA is output to a subsequent stage. Thus, a controller at a subsequent stage of the skew correction circuit 100 does not need to perform a dithering process. Accordingly, since the choice for controllers widens, and it is not necessary to consider controllers when considering a printer unit, it is advantageous for producing OEM printer units.

Figure 4:
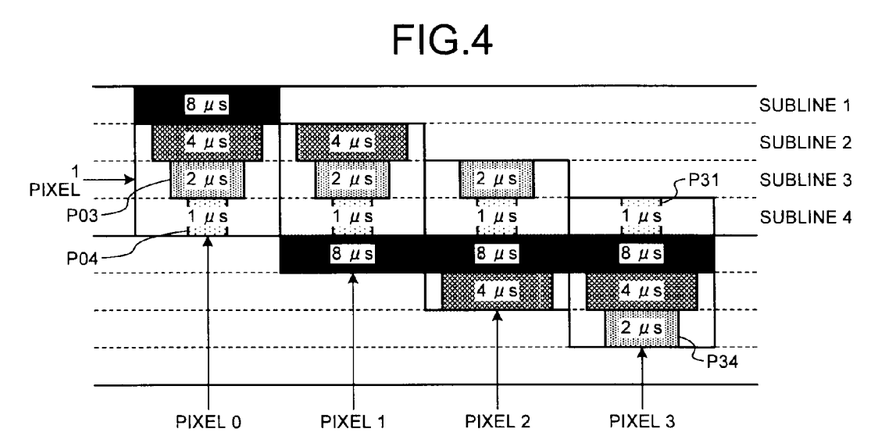
FIG. 4 is a diagram illustrating gradation control of image data after skew correction through subline lighting.

FIG. 4 is a diagram illustrating gradation control of image data after skew correction through subline lighting.

As shown in FIG. 4, skew correction is performed by dividing one line into four sublines 1, 2, 3, and 4. The correction is executed by the skew correction circuit 100 shown in FIG. 3.

The lighting period of the LEDA head 114 in the subline is constant for all dots in the same subline. In this example, the lighting period of the LEDA head 114 is 8 µs for the subline 1, 4 µs for the subline 2, 2 µs for the subline 3, and 1 µs for the subline 4. Through this combination of the lighting periods of the sublines, it is possible to control the lighting period in units of 1 µs between 0 and 15 µs. That is, it is possible to express 16-step gradation. In this case, the lighting of the LEDA head 114 is driven with binary data of ON/OFF.

In the present embodiment, in the LEDA head 114 driven with binary data, since gradation control and light intensity control described later are performed by the gradation control circuit 116 and the light intensity correction circuit 117, it is possible to express a higher gradation and prevent a reduction in gradation due to inclination correction.

In the case of binary data, since gradation expression is not necessary, by setting the lighting period of the same subline to be the same, it is possible to decrease a circuit size and realize cost reduction.

However, since the lighting period is determined for each subline, the order of lighting periods of sublines is changed when skew correction is performed in units of sublines. That is, in the case of pixel 1 which has been subjected to 1-subline skew correction in relation to pixel 0 which has not been subjected to skew correction, the lighting periods in one pixel are in the order of 4 µs, 2 µs, 1 µs, and 8 µs. In the case of pixel 2 which has been subjected to 2-subline skew correction in relation to pixel 0, the lighting periods in one pixel are in the order of 2 µs, 1 µs, 8 µs, and 4 µs. In the case of pixel 3 which has been subjected to 3-subline skew correction in relation to pixel 0, the lighting periods in one pixel are in the order of 1 µs, 8 µs, 4 µs, and 2 µs. In this example, a pixel which has been subjected to skew correction by an amount corresponding to one line is referred to as pixel 1, and pixels which have been subjected to skew correction by amounts corresponding to two and three lines are referred to as pixels 2 and 3.

When it is desired to express gradation for a lighting period of 3 µs in a pixel (pixel 0) which is not subjected to skew correction, the third and fourth sublines P03 and P04 are lit. When it is desired to express gradation for a lighting period of 3 µs in a pixel (pixel 3) which is subjected to 3-subline skew correction, the first and fourth sublines P31 and P34 are lit. In this case, the amount of attached toner is different between the two pixels from the pixel 0 to the pixel 3. Specifically, since the sublines lit in the pixel 3 are more spaced than the pixel 0, the proportion of a spot diameter to the lighting period increases, and a larger amount of toner is attached. In order to correct this, the light intensity correction data of the pixel 3 is decreased. Alternatively, the light intensity correction data of the pixel 0 is increased. By performing lighting control (light intensity correction control) in this manner, it is possible to increase the gradation after skew correction further.

Figure 5:
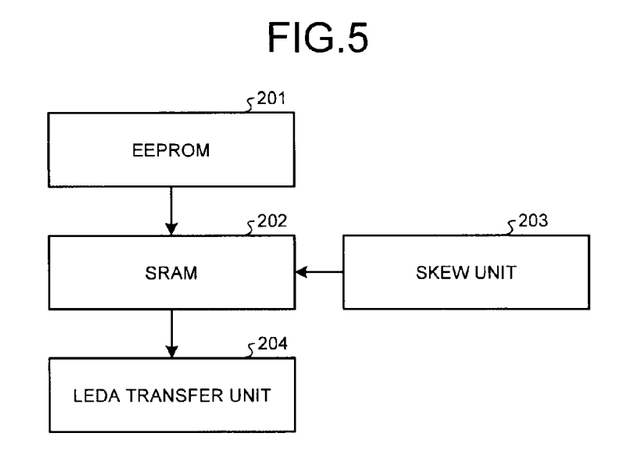
FIG. 5 is a diagram illustrating flow of a process of correcting light intensity correction data.

FIG. 5 is a diagram illustrating the flow of a process of correcting light intensity correction data.

In the figure, a light intensity control circuit for controlling the light intensity of the LEDA head (LEDA_BK, M, C, Y) 114 includes an electrically erasable programmable read-only memory (EEPROM) 201, a static random access memory (SRAM) 202, a SKEW unit 203, and a LEDA transfer unit 204. The light intensity correction data for all dots measured in advance are stored in the EEPROM 201. The SRAM 202 reads and stores therein the light intensity correction data stored in the EEPROM 201. That is, the elements shown in FIG. 5 and the control by these elements are executed based on SK_DATA (correction image data) which is input through a gradation correction circuit (not shown) from the correction image data output unit 113 of the skew correction circuit 100 shown in FIG. 3.

The SKEW unit 203 rewrites the light intensity correction data stored in the SRAM 202 in accordance with the "number of steps (number of sublines) to shift" and the "scanning position" obtained by the skew correction circuit 100 described in FIG. 3. In this case, the light intensity correction data is rewritten based on the main-scanning position and a value based on a residue obtained by dividing the number of steps to shift by N (where the resolution in the sub-scanning direction is N times the VIDEO data) (N is an integer of 2 or more). The light intensity correction data can be rewritten for all dots.

Rewriting of the light intensity correction data will be described with reference to FIG. 4, for example. Since the number of sublines is 4, the resolution N in the sub-scanning direction is "4". If the number of steps to shift is 1, since the residue of the division of 1 by 4 is "1," this corresponds to the pixel 1 in FIG. 4. Thus, the light intensity correction data is rewritten with the correction data of the pixel 1. If the number of steps to shift is 3, since the residue of the division of 3 by 4 is "3," this corresponds to the pixel 3. Thus, the light intensity correction data is rewritten with the correction data of the pixel 3.

The rewritten light intensity correction data is stored in the SRAM 202 and transferred from the LEDA transfer unit 204 to a driver of the LEDA head. The LEDA head determines the light intensity based on the light intensity correction data transferred from the SRAM 202, corrects the light intensity based on the input image (VIDEO) data 115 as shown in FIG. 3, and performs lighting and writing in accordance with the corrected light intensity. In this way, it is possible to express higher gradation and prevent a reduction in gradation due to inclination correction.

In the present embodiment, the gradation control of the image data after skew correction through subline lighting shown in FIG. 4 is executed by the gradation control circuit 116; and the light intensity correction control shown in FIG. 5 is executed by the light intensity correction circuit 117, so that the gradation and the light intensity are corrected in parallel.

Figure 6:
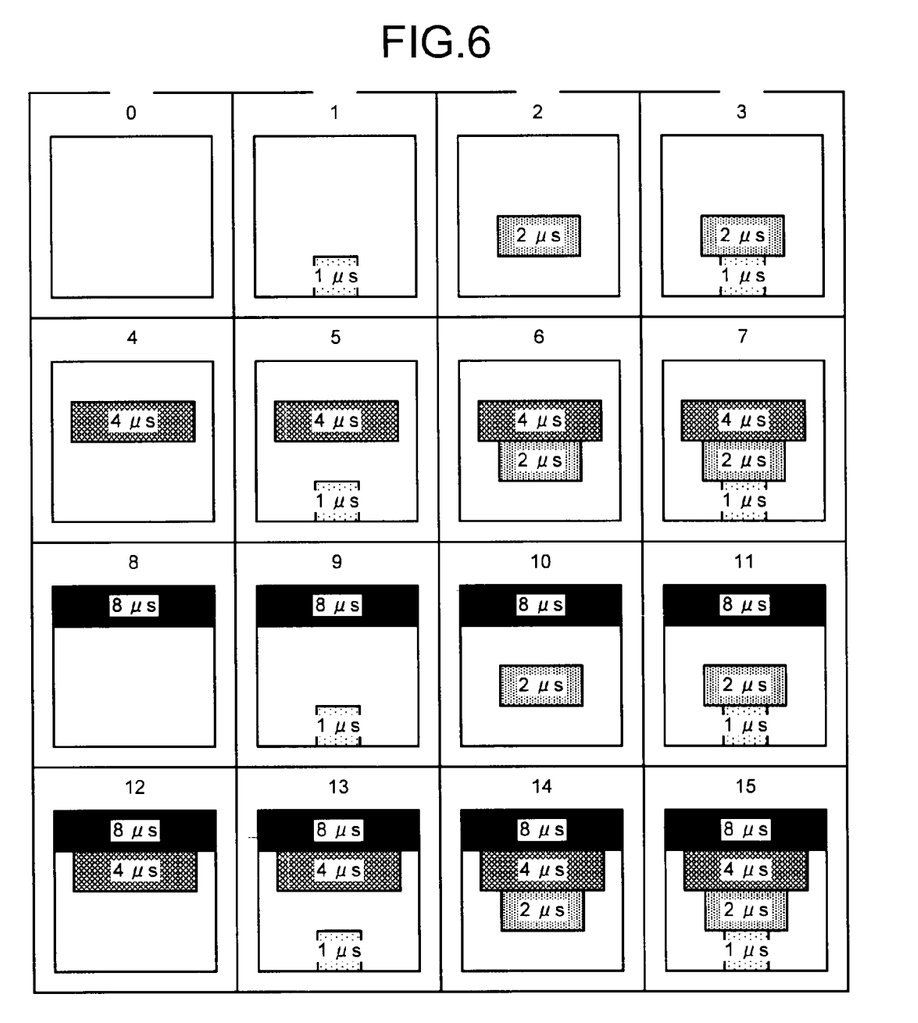
FIG. 6 is a diagram illustrating a subline lighting pattern for displaying 16 gradations of pixel 0 which has not been subjected to the skew correction in FIG. 4.

FIG. 6 is a diagram illustrating a subline lighting pattern for displaying 16 gradations of pixel 0 which has not been subjected to the skew correction in FIG. 4.

The subline lighting pattern is in the order of 8 µs, 4 µs, 2 µs, and 1 µs, as shown in FIG. 4. In FIG. 6, the numbers "0" to "15" represent the lighting patterns of 16 gradations from 0 to 15, of the pixel 0. It can be understood that it is possible to express 16 gradations by combining the subline lighting patterns shown in FIG. 4 in this way. The toner attachment amount in gradation in which sublines are not adjacent is larger than that of other pixel patterns (pixels 1, 2, and 3) in which sublines are adjacent.

Figure 7:
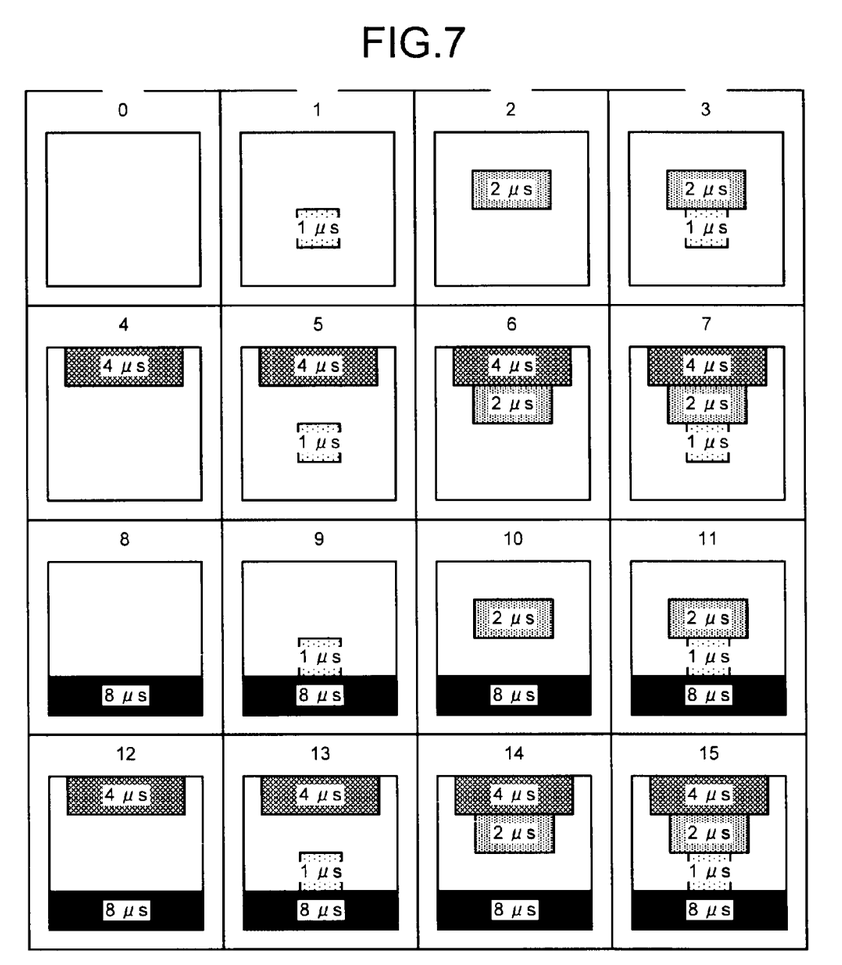
FIG. 7 is a diagram illustrating a subline lighting pattern for displaying 16 gradations of pixel 1 which has been subjected to the 1-subline skew correction in FIG. 4.

FIG. 7 is a diagram illustrating a subline lighting pattern for displaying 16 gradations of pixel 1 which has been subjected to the 1-subline skew correction in FIG. 4.

The subline lighting pattern is in the order of 4 µs, 2 µs, 1 µs, and 8 µs, as shown in FIG. 4. In FIG. 7, the numbers "0" to "15" represent the lighting patterns of 16 gradations from 0 to 15, of the pixel 1. It can be understood that it is possible to express 16 gradations by combining the subline lighting patterns shown in FIG. 4 in this way. As described above, the toner attachment amount in gradation in which sublines are not adjacent is larger than that of other pixel patterns (pixels 0, 2, and 3) in which sublines are adjacent. Moreover, the toner attachment amount in low gradation is larger than that of higher gradation.

Figure 8:
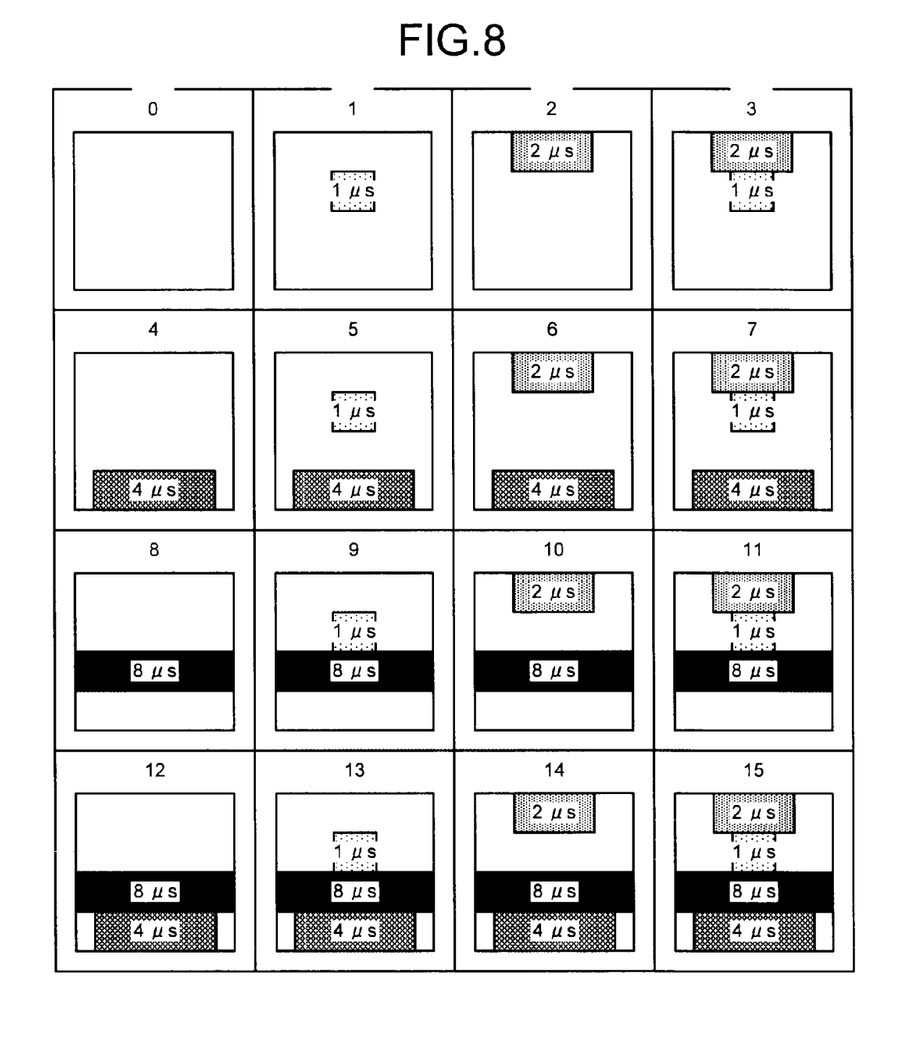
FIG. 8 is a diagram illustrating a subline lighting pattern for displaying 16 gradations of pixel 2 which has been subjected to the 2-subline skew correction in FIG. 4.

FIG. 8 is a diagram illustrating a subline lighting pattern for displaying 16 gradations of pixel 2 which has been subjected to the 2-subline skew correction in FIG. 4.

The subline lighting pattern is in the order of 2 µs, 1 µs, 8 µs, and 4 µs, as shown in FIG. 4. In FIG. 8, the numbers "0" to "15" represent the lighting patterns of 16 gradations from 0 to 15, of the pixel 2. It can be understood that it is possible to express 16 gradations by combining the subline lighting patterns shown in FIG. 4 in this way. As described above, the toner attachment amount in gradation in which sublines are not adjacent is larger than that of other pixel patterns (pixels 0, 1, and 3) in which sublines are adjacent. Moreover, as described above, the toner attachment amount in low gradation is larger than that of higher gradation.

In the pixel 2 of FIG. 8, the subline lighting patterns of the low gradation are not adjacent as compared to the pixels 0 and 1 shown in FIGS. 6 and 7. Thus, the light intensity correction data of the pixel 2 is rewritten with smaller one. In this case, since the sublines in the low-gradation pixel are spaced from each other, although the spot diameter increases so that the toner attachment amount increases, a change in gradation is prevented by rewriting the light intensity correction data with smaller one. As a result, it is possible to prevent a reduction in gradation due to inclination correction.

Figure 9:
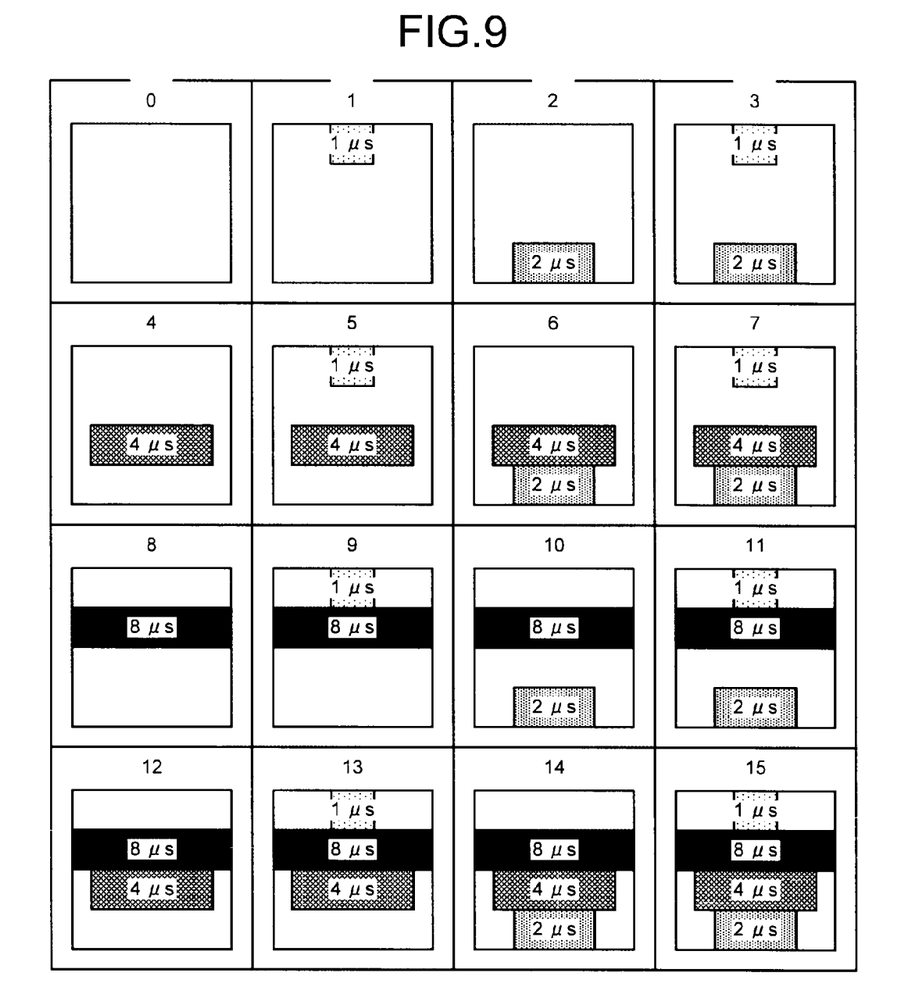
FIG. 9 is a diagram illustrating a subline lighting pattern for displaying 16 gradations of pixel 3 which has been subjected to the 3-subline skew correction in FIG. 4.

FIG. 9 is a diagram illustrating a subline lighting pattern for displaying 16 gradations of pixel 3 which has been subjected to the 3-subline skew correction in FIG. 4.

The subline lighting pattern is in the order of 1 µs, 8 µs, 4 µs, and 2 µs, as shown in FIG. 4. In FIG. 9, the numbers "0" to "15" represent the lighting patterns of 16 gradations from 0 to 15, of the pixel 3. It can be understood that it is possible to express 16 gradations by combining the subline lighting patterns shown in FIG. 4 in this way. As described above, the tone attachment amount in gradation in which sublines are not adjacent is larger than that of other pixel patterns (pixels 0, 1, and 2) in which sublines are adjacent. Moreover, as described above, the toner attachment amount in low gradation is larger than that of higher gradation. In FIG. 9, the subline lighting patterns of the low gradation are not adjacent as compared to the pixels 0 and 1 shown in FIGS. 6 and 7. Thus, the light intensity correction data of the pixel 3 is rewritten with smaller one similarly to the pixel 2.

In the respective pixels shown in FIGS. 6 to 9, when the sublines necessary for expressing high gradation are spaced from each other, the light intensity correction data of the pixel is increased. This is because when the sublines of a high-gradation pixel are spaced from each other, since the tone attachment amount does not increase, there is no effect on the spot diameter. Thus, the toner attachment amount is increased in order to prevent a change in the gradation due to a decrease in the toner attachment amount as compared to a low-gradation pixel. In this way, it is possible to prevent a reduction in gradation due to inclination correction.

Figure 10A:
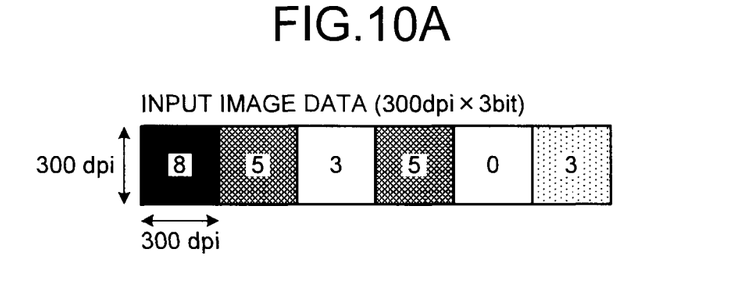
FIGS. 10A and 10B are diagrams illustrating a gradation expression in the present embodiment according to a 2×-density (double-density) mode in the main and sub-scanning directions.
Figure 10B:
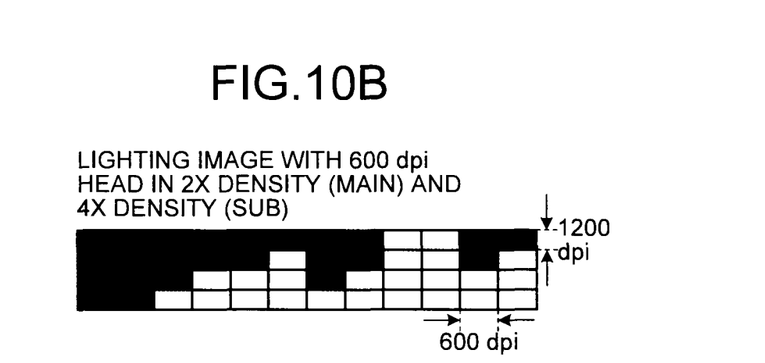

The skew correction described in FIGS. 6 to 9 is performed in units of pixels; and gradation is expressed by a combination of sublines and lighting periods in units of pixels. On the other hand, gradation can be expressed using a plurality of pixels of M dots in the main-scanning direction. FIGS. 10A and 10B are diagrams illustrating a gradation expression in the present embodiment according to a 2×-density mode (double-density mode) in the main and sub-scanning directions. FIG. 10A shows input image data, and FIG. 10B shows a lighting image with a 600 dpi head in a 2× (double) density mode in the main-scanning direction and a 4× (quadplex) density mode in the sub-scanning direction.

The input VIDEO data (input image data) has a resolution of 300 dpi×3 bits in the main-scanning direction and 300 dpi in the sub-scanning direction, and the output LEDA head has a resolution of 600 dpi in the main-scanning direction. Since the VIDEO data has a resolution of 300 dpi×3 bits in the main-scanning direction, the VIDEO data is increased two times (2× density) in the main-scanning direction when the 600 dpi LEDA head outputs the VIDEO data. In this way, it is possible to express three gradations of 0, 1, and 2 in the main-scanning direction.

On the other hand, since the VIDEO data has a resolution of 300 dpi in the sub-scanning direction, the VIDEO data is increased by four times (4× density) when the 600 dpi LEDA head outputs the VIDEO data. In this way, the resolution in the sub-scanning direction becomes 1200 dpi, and a "2×4" matrix is formed for one input pixel in association with the 2× density in the main-scanning direction. As a result, it is possible to express 9 (nine) gradations of 0 to 8.

In the present embodiment, when expressing gradation using a plurality of pixels of M dots (=2 dots) in the main-scanning direction, a skew correction area is made up of 4 dots which is a multiple of M (=2 dots).

As above, since the skew correction area is made up of a multiple of M dots (M is a positive integer), the boundary of the M dots for expressing gradation will be located at the boundary of the skew correction area and will not be located at other positions. As a result, it is possible to express high gradation.

In the present embodiment, although the LEDA head is used as the line head, an organic EL head may be used.

In the present embodiment, a plurality of sublines is generated from the same image data using the skew correction circuit 100, the gradation control circuit 116, and the light intensity correction circuit 117; the generated sublines are continuously exposed to correct an inclination of an exposure position; the lighting of the sublines is controlled based on the correction results to express gradation; and the light intensity correction data is controlled based on the correction result, whereby the LEDA head 114 is lit. However, this function may be substituted with a computer program and the program may be executed by a computer. In this case, the computer program includes: at least a first procedure of generating a plurality of sublines from data; a second procedure of continuously exposing the generated sublines to generate correction image data for correcting an inclination of an exposure position; a third procedure of controlling the lighting of the sublines based on the correction image data obtained in the second procedure to express gradation; and a fourth procedure of correcting and controlling the light intensity based on the correction image data obtained in the second procedure.

As above, according to the present embodiment, in an image forming apparatus in which a binary LEDA head is used as an exposure source, a gradation expression when skew correction is performed is controlled by a combination of exposure time control through subline lighting and light intensity correction control that controls current supplied to LED elements, the subline lighting period order of pixels which have been subjected to skew correction is changed to change the proportion of a spot diameter to a lighting period to thereby correct a change in a toner attachment amount. Thus, it is possible to make the toner attachment amount uniform while increasing the gradation expression after skew correction to a higher gradation.

According to the aspects of the invention, due to the configuration described above, when images are formed using a line head driven with binary data as an exposure source, it is possible to perform skew correction with a uniform toner attachment amount while realizing a high gradation expression.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus for controlling the lighting of a line head that is driven with binary data and performs exposure with subline lighting to thereby form images, comprising:
   a subline generating unit that generates a plurality of sublines from a same image data;
   an inclination correcting unit that generates correction image data used to correct an inclination of an exposure position;
   a gradation control unit that controls the lighting of sublines based on the correction image data generated by the inclination correcting unit to express gradation; and
   a light intensity correction unit that corrects and controls the light intensity based on the correction image data generated by the inclination correcting unit,
   wherein an output of the gradation control unit and an output of the light intensity correction unit are input into the line head in parallel.

2. The image processing apparatus according to claim 1, wherein the light intensity correction unit rewrites light intensity correction data based on a main-scanning position and a value based on a residue obtained by dividing the number of steps to shift obtained through the inclination correction by N (N is an integer of 2 or more), where a resolution in a sub-scanning direction is N times the image data.

3. The image processing apparatus according to claim 1, wherein
   the light intensity correction unit reduces a light intensity correction amount for a pixel shifted by the inclination correcting unit when sublines necessary for expressing low gradation are spaced from each other.

4. The image processing apparatus according to claim 1, wherein
   the light intensity correction unit increases a light intensity correction amount for a pixel shifted by the inclination correcting unit when sublines necessary for expressing high gradation are spaced from each other.

5. The image processing apparatus according to claim 1, wherein
   when gradation is expressed using a plurality of pixels of M dots in the main-scanning direction, the gradation control unit controls so that a skew correction area is made up of multiple of M (M is an integer of 2 or more).

6. The image processing apparatus according to claim 1, wherein
   the image data is binary data, and the lighting periods of all sublines are the same.

7. The image processing apparatus according to claim 1, wherein
the inclination correcting unit performs inclination correction on image data which has been subjected to a dithering process.

8. The image processing apparatus according to claim 1, wherein
the line head is of a light emitting diode array head.

9. The image processing apparatus according to claim 1, wherein
the line head is of an organic EL head.

10. An image processing method for controlling lighting of a line head that performs exposure through subline lighting to thereby form images, comprising:
generating a plurality of sublines from a same image data;
generating correction image data for correcting an inclination of an exposure position;
controlling the lighting of sublines based on the correction image data generated at the correction image data generating so as to express gradation; and
correcting the light intensity based on the correction image data generated at the exposing so as to control the light intensity.

11. A computer program product comprising a non-transitory computer-usable medium having computer-readable program codes embodied in the medium for image processing in controlling lighting of a line head that performs exposure through subline lighting to thereby form images, the program codes when executed causing a computer to execute:
generating a plurality of sublines from a same image data;
generating correction image data for correcting an inclination of an exposure position;
controlling the lighting of sublines based on the correction image data generated at the correction image data generating so as to express gradation; and
correcting the light intensity based on the correction image data generated at the exposing so as to control the light intensity.

* * * * *